No. 869,834.
PATENTED OCT. 29, 1907.
J. C. FOOSHE.
HARROW ATTACHMENT FOR PLOWS.
APPLICATION FILED FEB. 26, 1907.
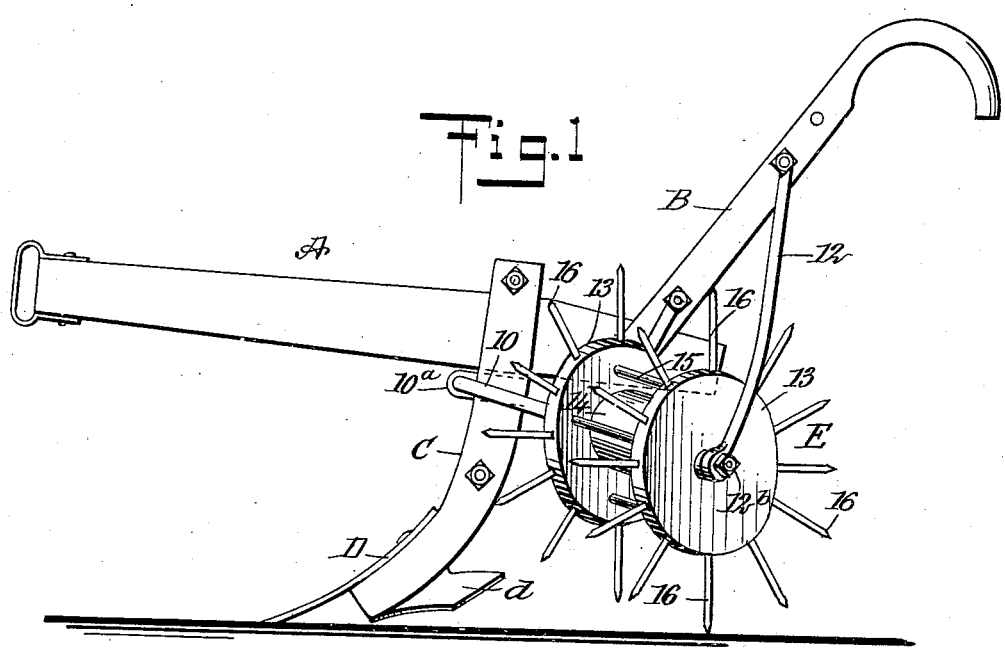
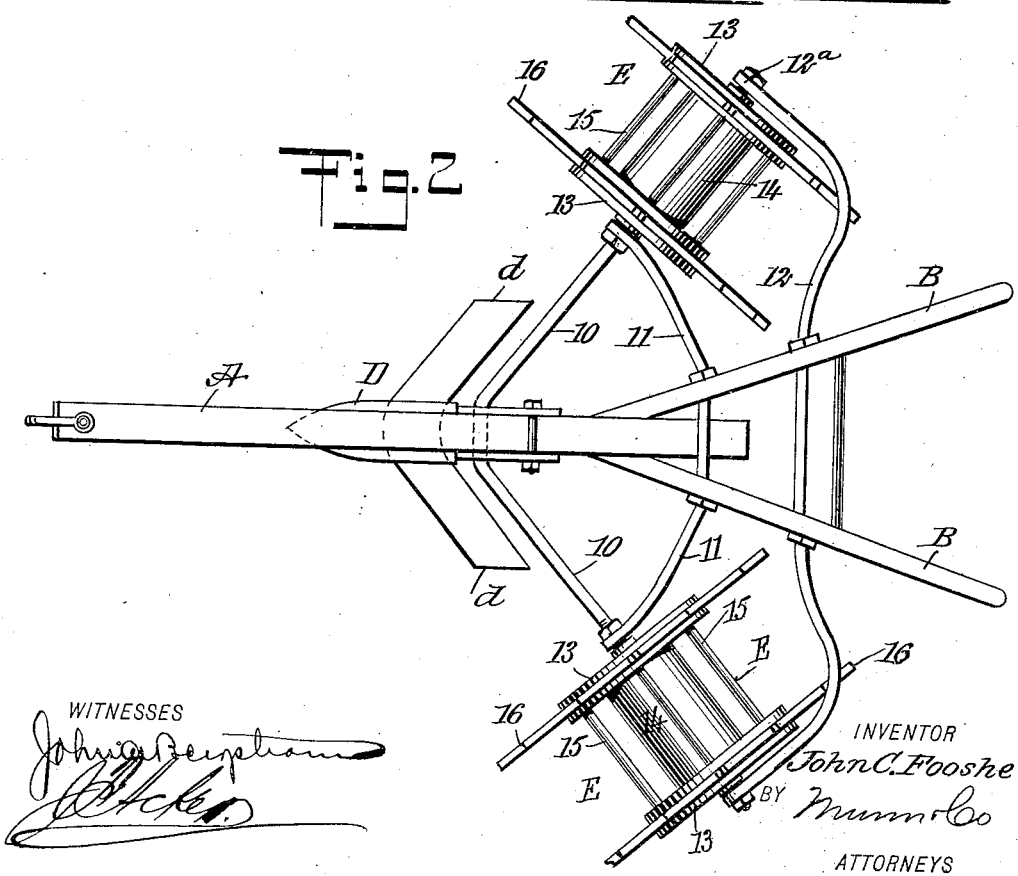
INVENTOR
John C. Fooshe
BY Munn & Co
ATTORNEYS

UNITED STATES PATENT OFFICE.

JOHN COLEMAN FOOSHE, OF NINETY SIX, SOUTH CAROLINA.

HARROW ATTACHMENT FOR PLOWS.

No. 869,834.        Specification of Letters Patent.        Patented Oct. 29, 1907.

Application filed February 26, 1907. Serial No. 359,498.

*To all whom it may concern:*

Be it known that I, JOHN COLEMAN FOOSHE, a citizen of the United States, and a resident of Ninety Six, in the county of Greenwood and State of South Carolina, have invented a new and useful Improvement in Harrow Attachments for Plows, of which the following is a full, clear, and exact description.

The purpose of the invention is to provide an improvement upon the construction of the harrow attachment for plows for which Letters Patent were granted to me June 23, 1903, Serial No. 731,881, to the extent that a winged shovel is employed and two disk cultivators are supported at each side of the beam arranged to cultivate those portions of two rows of plants adjacent to the roots which the shovel does not ordinarily reach, accomplishing this result while the shovel is operating upon the central portion of the furrow between said rows, thus enabling all of the ground to be furrowed from the center to the roots of the plants, and to be upturned and loosened, and at the same time accelerating the work of cultivating large tracts of planted ground.

The invention consists in the novel construction and combination of the several parts as will be hereinafter fully set forth and pointed out in the claims.

Reference is to be had to the accompanying drawings forming a part of this specification, in which similar characters of reference indicate corresponding parts in both the figures.

Figure 1 is a side elevation of the improved implement; and Fig. 2 is a plan view of the same.

A represents the beam of a plow, B its handles, C the stock, and D a shovel, which by preference is a winged one, being provided with a wing $d$ extending out from each side, as is illustrated. An axle 10 is held in suitable bearings 10$^a$ attached to the forward upper portion of the stock C. This axle extends rearwardly and outwardly from the stock proportionately in opposite directions, as is shown best in Fig. 2. This axle 10 is preferably supported by means of a brace 11 attached to its members between the terminals and the point of bearing at the stock C, and the said brace 11 is carried up over the beam A at the rear of the handles B, and is secured in any suitable or approved manner to such parts. The axle 10 is further supported by means of a second and longer brace 12 that is carried from the terminal portions of the axle 10 and through the handles C at any suitable point in their length, as is also best shown in Fig. 2, but the brace 12 is provided with eyes 12$^a$ at its ends, each eye receiving the outer end portions of the axle 10, and is held in position by suitable nuts 12$^b$.

Each member of the axle 10 is adapted to carry a disk harrow E, each disk harrow consisting of opposing disks 13 connected by suitable hubs 14 and bars 15, and each disk 13 has secured thereto a series of radial teeth 16, the teeth of the opposing disks of a harrow being preferably in alinement although the teeth carried by one disk may be so placed as to be opposite the space between the teeth carried by the opposing disk of a harrow. These harrows are adapted to turn loosely upon the axle 10 and are located between the braces 11 and 12.

The length and inclination of the harrow supporting rod or axle 10 is such that when the shovel D is operated in a furrow between two rows of plants the ends of the axle 10 will extend over the plants at each side of the furrow, bringing the harrows E in engagement with the ground in the furrows at the point close to the roots of the plants, thus cultivating that portion of the furrows which is not ordinarily reached by a shovel even though the shovel be a winged one.

It is evident that with an implement of the character described a planted furrow that is to be cultivated can be cultivated much more rapidly and much more effectually than with the ordinary appliances for such purpose.

The attachment is very simple, is economic and readily applicable to any type of plow.

Having thus described my invention, I claim as new and desire to secure by Letters Patent,—

1. In a harrow attachment for plows, the combination with the plow beam and the stock and the handles for the beam, of an axle supported by the stock and having a rearward and outward inclination from said stock at both sides thereof, the harrows comprising spaced disks provided with radial teeth mounted upon the said axle at its outer end portions.

2. In a harrow attachment for plows, the combination with the plow beam and the stock and the handles for the beam, of an axle supported by the stock and having a rearward and outward inclination from said stock at both sides thereof, braces for the said axle, and harrows mounted upon the said axle at its outer end portion, said harrows consisting each of opposing disks having teeth radially secured therein, and a connecting hub.

3. In a harrow attachment for plows, the combination with a plow beam, the handles therefor, the stock, and a winged shovel carried by the said stock, of an axle extending from the said stock in a rearward and outward direction at each side of the same, braces for the said axle, and harrows mounted to revolve on the axle between the said braces, which harrows consist of disk end sections, a connecting hub, connecting bars, and teeth radially secured in the said disks for the purpose described.

In testimony whereof I have signed my name to this specification in the presence of two subscribing witnesses.

JOHN COLEMAN FOOSHE.

Witnesses:
JAS. R. HAINE,
W. O. SELF.